United States Patent
Qiu et al.

(10) Patent No.: US 9,580,543 B1
(45) Date of Patent: Feb. 28, 2017

(54) METHOD OF MAKING BRANCHED POLYESTER RESIN WITH A TARGET GLASS TRANSITION TEMPERATURE

(71) Applicant: XEROX CORPORATION, Norwalk, CT (US)

(72) Inventors: Shigang S. Qiu, Etobicoke (CA); Karen A. Moffat, Brantford (CA); Keegan Rankin, Brampton (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/017,386

(22) Filed: Feb. 5, 2016

(51) Int. Cl.
| | |
|---|---|
| *C08G 63/02* | (2006.01) |
| *C08G 63/64* | (2006.01) |
| *C08G 63/78* | (2006.01) |
| *G03G 9/087* | (2006.01) |
| *C08G 64/00* | (2006.01) |

(52) U.S. Cl.
CPC ............. *C08G 63/64* (2013.01); *C08G 63/78* (2013.01); *G03G 9/08755* (2013.01)

(58) Field of Classification Search
CPC ...................................................... C08G 64/28
USPC .... 528/196, 198; 524/403; 430/109.4, 110.2
See application file for complete search history.

(56) References Cited

U.S. PATENT DOCUMENTS

| | | |
|---|---|---|
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,364,729 A | 11/1994 | Kmiecik-Lawrynowicz et al. |
| 5,370,963 A | 12/1994 | Patel et al. |
| 5,403,693 A | 4/1995 | Patel et al. |
| 5,418,108 A | 5/1995 | Kmiecik-Lawrynowicz et al. |
| 6,187,047 B1 * | 2/2001 | Kwan ....................... A61F 2/28 623/16.11 |
| 8,288,499 B2 | 10/2012 | Shirai et al. |

* cited by examiner

*Primary Examiner* — Terressa Boykin
(74) *Attorney, Agent, or Firm* — Pillsbury Winthrop Shaw Pittman LLP

(57) ABSTRACT

A method of making a branched polyester resin with a target glass transition temperature. Particularly, the target glass transition temperature can be achieved by adjusting the molar ratio of the first cyclic alkylene carbonate to the second cyclic alkylene carbonate; adjusting the molar ratio of the first alkoxylated BPA monomer to the second alkoxylated BPA monomers; adjusting the molar ratio of the first diacid to the second diacid; or any combination thereof.

20 Claims, 11 Drawing Sheets

METHOD OF MAKING BRANCHED POLYESTER RESIN WITH A TARGET GLASS TRANSITION TEMPERATURE

BACKGROUND

The present disclosure relates to, in various exemplary embodiments, processes in synthesizing a branched amorphous polyester resin with a target glass transition temperature (Tg). The branched amorphous polyester resin of the present embodiments may be used in toners, such as Emulsion Aggregation (EA) toners, which are prepared using an emulsion aggregation process. Emulsion aggregation processes for the preparation of toners are illustrated in a number of Xerox patents, the disclosures of which are totally incorporated herein by reference, such as U.S. Pat. Nos. 5,290,654, 5,278,020, 5,308,734, 5,346,797, 5,370,963, 5,344,738, 5,403,693, 5,418,108, and 5,364,729.

Toners must not aggregate or block during manufacturing, transport or storage periods before use in electrographic systems, and must exhibit low fusing temperature properties in order to minimize fuser energy requirements. Accordingly, to satisfy blocking requirements, toner resins should exhibit a Tg of from about 40° C. to about 80° C. If the Tg exceeds 60° C., then it may lead to issues of long aggregation time in the toner producing process, and elevated minimum fix temperature for the toner to adhere properly to the substrate. The minimum fixed temperature is the minimum temperature needed for the toner particles to adhere to the substrate.

Fixing performance of toners can be characterized as a function of temperature and pressure. The temperature at which the toner adheres to the fuser roll is called the hot offset temperature (HOT). When the fuser temperature exceeds HOT, some of the molten toner adheres to the fuser roll during fixing and is transferred to subsequent substrates containing developed images, resulting for example in blurred images. This undesirable phenomenon is called offsetting. Less than the HOT of the toner is the minimum fixing temperature (MFT) of the toner, which is the minimum temperature at which acceptable adhesion of the toner to the support medium occurs. Toner resins should exhibit a MFT of 60° C. or above (e.g., from about 60° C. to about 140° C.) to adhere properly to the substrate, and a HOT of 190° C. or above (e.g., from about 190 to about 230) to avoid print defects and fuser contamination.

One major difficulty in producing branched amorphous polyester resins is to properly control the degree of branching which is the fraction of the resin that is not completely soluble in solvent. The controlled amount of branching is necessary to optimize the fusing performance. In general, typical concerns with the synthesis of branched amorphous polyester resins include the uses of dangerous materials, such as, ethylene oxide, and propylene oxide, which are dangerous flammable toxic gases that require special costly equipment for safe handling. Another concern with the existing process for producing branched amorphous polyesters is the isolation of the alkoxylated intermediates prior to use in the polyesterification step, which leads to additional cost and complexity in synthesizing the final branched amorphous polyester resins.

Thus, there exists a need to improve the current process of producing branched amorphous polyester resins while maintaining the desired target glass transition temperature of the resin.

SUMMARY

Embodiments herein relate to a method making a branched polyester resin with a target glass transition temperature, the method comprising reacting monomer bisphenol A (BPA) with a first cyclic alkylene carbonate in the presence of a first base to obtain a first alkoxylated BPA monomer; reacting monomer BPA with a second cyclic alkylene carbonate in the presence of a second base to obtain a second alkoxylated BPA monomer; copolymerizing the first and the second alkoxylated BPA monomers with a first diacid and a second diacid in the presence of a catalyst to obtain a copolymer; and condensing the copolymer with an acid anhydride; wherein the target glass transition temperature is achieved by adjusting the molar ratio of the first cyclic alkylene carbonate to the second cyclic alkylene carbonate, adjusting the molar ratio of the first alkoxylated BPA monomer to the second alkoxylated BPA monomers, adjusting the molar ratio of the first diacid to the second diacid, or any combination thereof.

In certain embodiments, the disclosure provides method of making a branched polyester resin having a target glass transition temperature of from 50° C. to 62° C., the method comprising: reacting monomer bisphenol A (BPA) with propylene carbonate in the presence of a base to obtain a first alkoxylated BPA monomer; reacting monomer BPA with ethylene carbonate in the presence of the base to obtain a second alkoxylated BPA monomer; reacting monomer bisphenol A (BPA) with a mixture of propylene carbonate and ethylene carbonate in the presence of the base to obtain a third alkoxylated BPA monomer; copolymerizing the first and the second alkoxylated BPA monomers with terephthalic acid and dodecenylsuccinic anhydride (DDSA) in the presence of a catalyst to obtain a copolymer, wherein the mole percent range of DDSA is from about 36 mole percent to about 52 mole percent based on the total moles of the first alkoxylated BPA, the second alkoxylated BPA, terephthalic acid and DDSA; and condensing the copolymer with an acid anhydride, wherein the acid anhydride comprises a triacid; wherein the target glass transition temperature is achieved by adjusting the molar ratio of propylene carbonate to ethylene carbonate, adjusting the molar ratio of the first alkoxylated BPA monomer to the second alkoxylated BPA monomers, adjusting the molar ratio of terephthalic acid to dodecenylsuccinic anhydride, or any combination thereof.

In certain embodiments, the disclosure provides a method of making a branched polyester resin with a target glass transition temperature of from about 50° C. to about 62° C., the method comprising reacting monomer bisphenol A (BPA) with propylene carbonate in the presence of a first base to obtain a first alkoxylated BPA monomer; reacting monomer BPA with ethylene carbonate in the presence of a second base to obtain a second alkoxylated BPA monomer; copolymerizing the first and the second alkoxylated BPA monomers with terephthalic acid and dodecenylsuccinic anhydride (DDSA) in the presence of a catalyst to obtain a copolymer, wherein the mole percent range of DDSA is from about 36 mole percent to about 52 mole percent based on the total moles of the first alkoxylated BPA, the second alkoxylated BPA, terephthalic acid and DDSA; and condensing the copolymer with an acid anhydride, wherein the acid anhydride comprises a triacid or tetraacid; wherein the target glass transition temperature is achieved by adjusting the molar ratio of propylene carbonate to ethylene carbonate, adjusting the molar ratio of the first alkoxylated BPA monomer to the second alkoxylated BPA monomers, adjusting the molar ratio of terephthalic acid to dodecenylsuccinic anhydride, or any combination thereof.

BRIEF DESCRIPTION OF THE DRAWINGS

For better understanding of the present embodiments, reference may be made to the accompanying figures.

DETAILED DESCRIPTION

Figure 1:
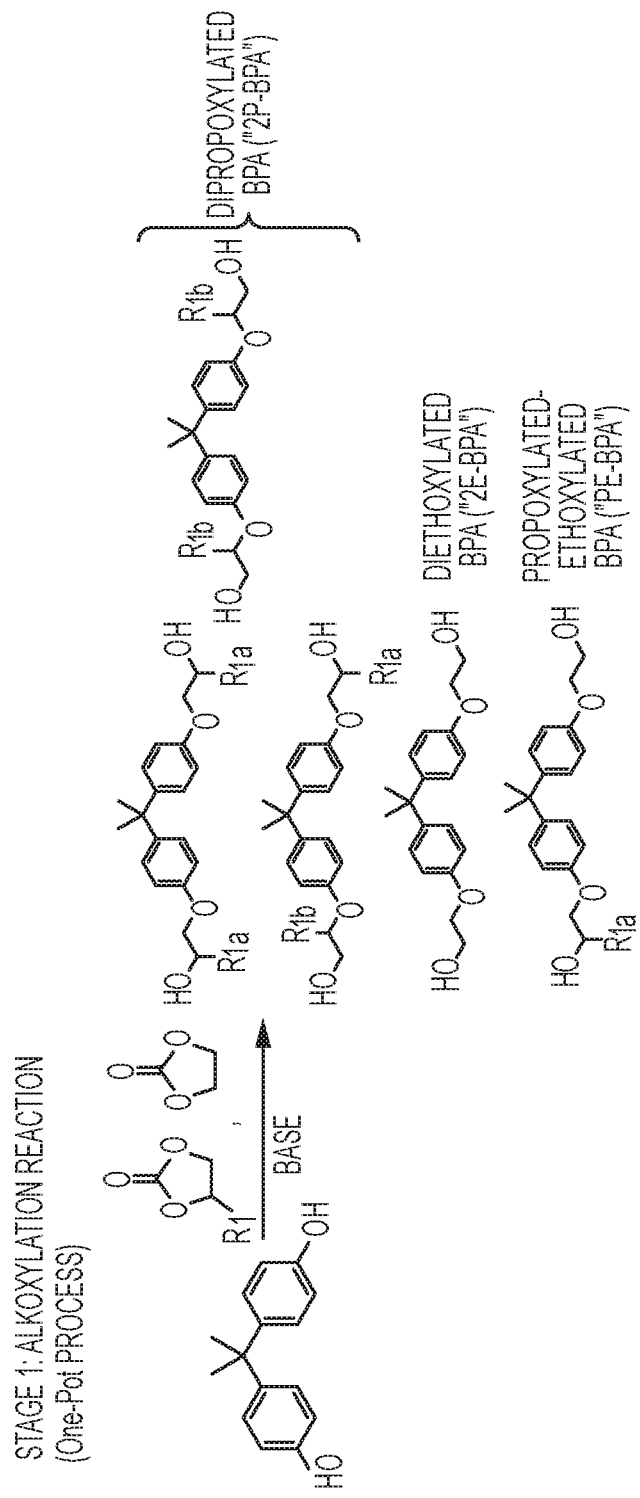
FIG. 1 shows exemplary reaction schemes of the three stages (stage 1: alkoxylation reaction; stage 2: esterification reaction; and stage 3: polycondensation) in accordance to certain embodiments of the present disclosure.
Figure 1:
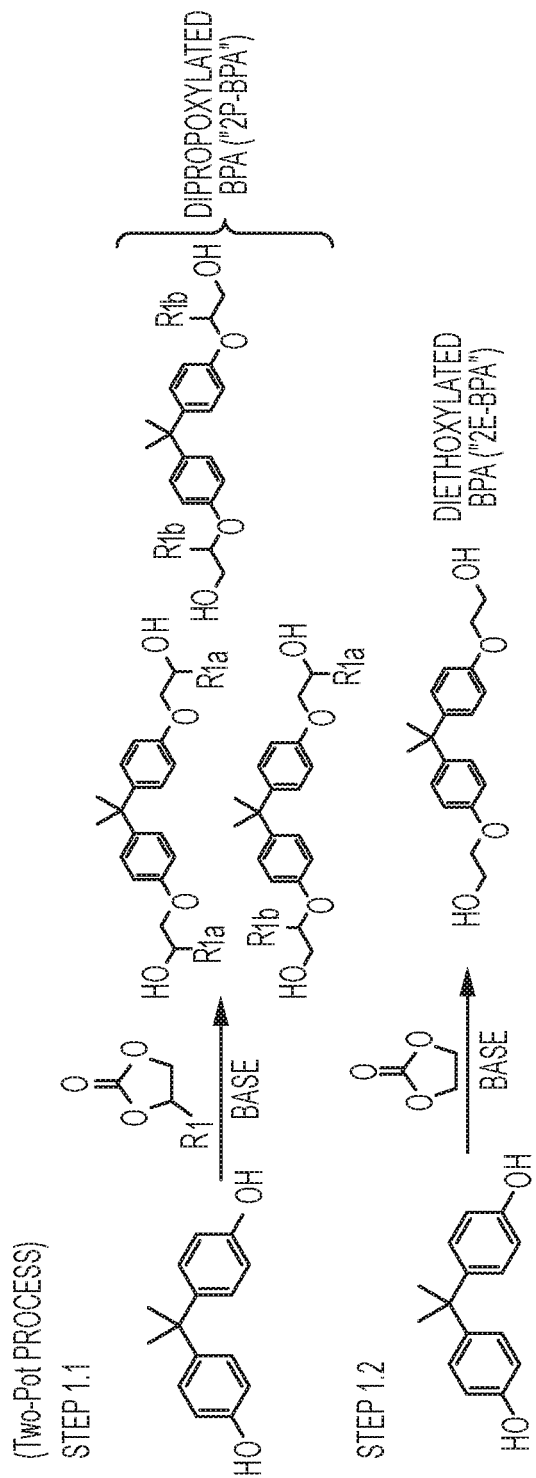
Figure 1:
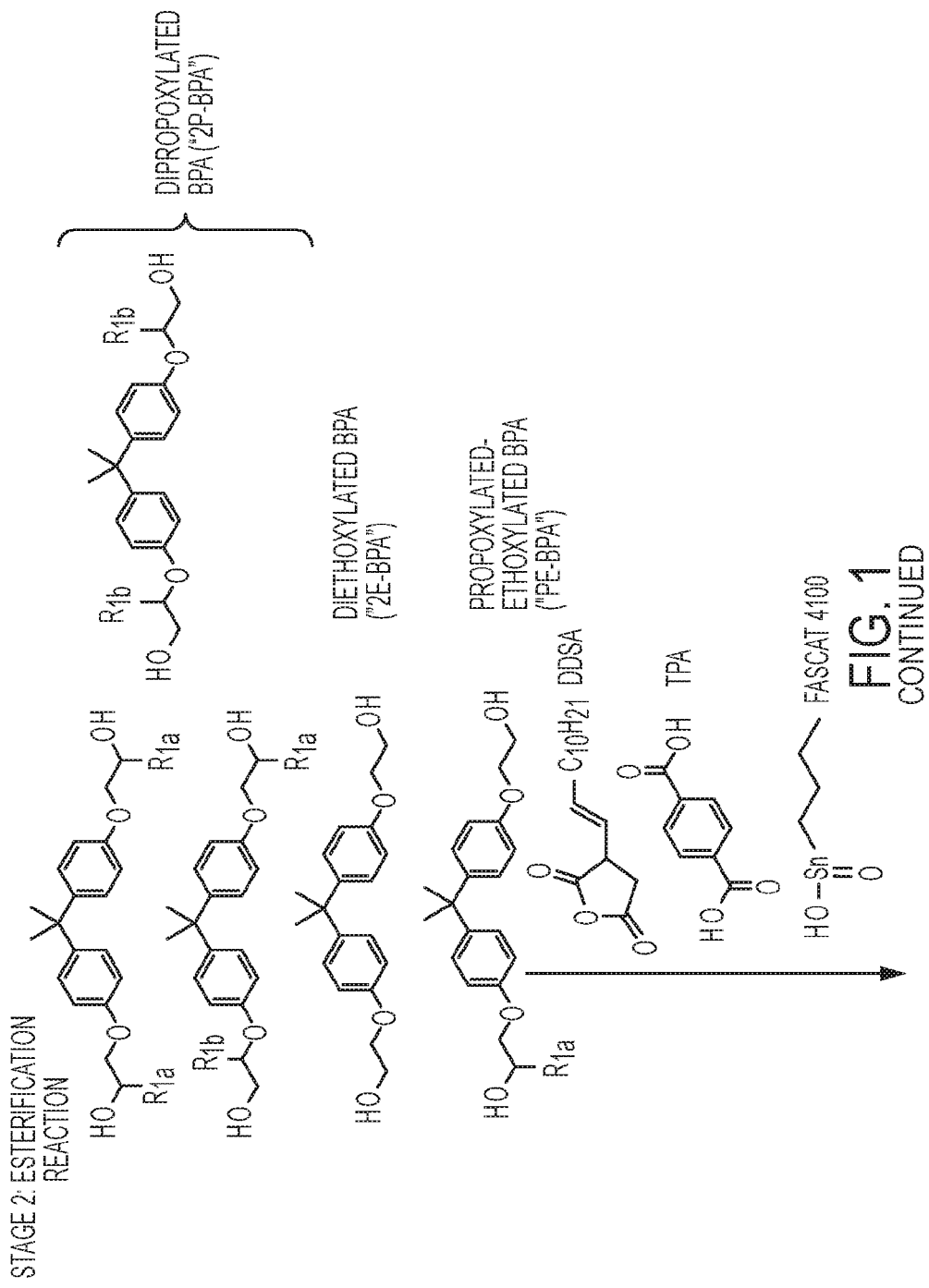
Figure 1:
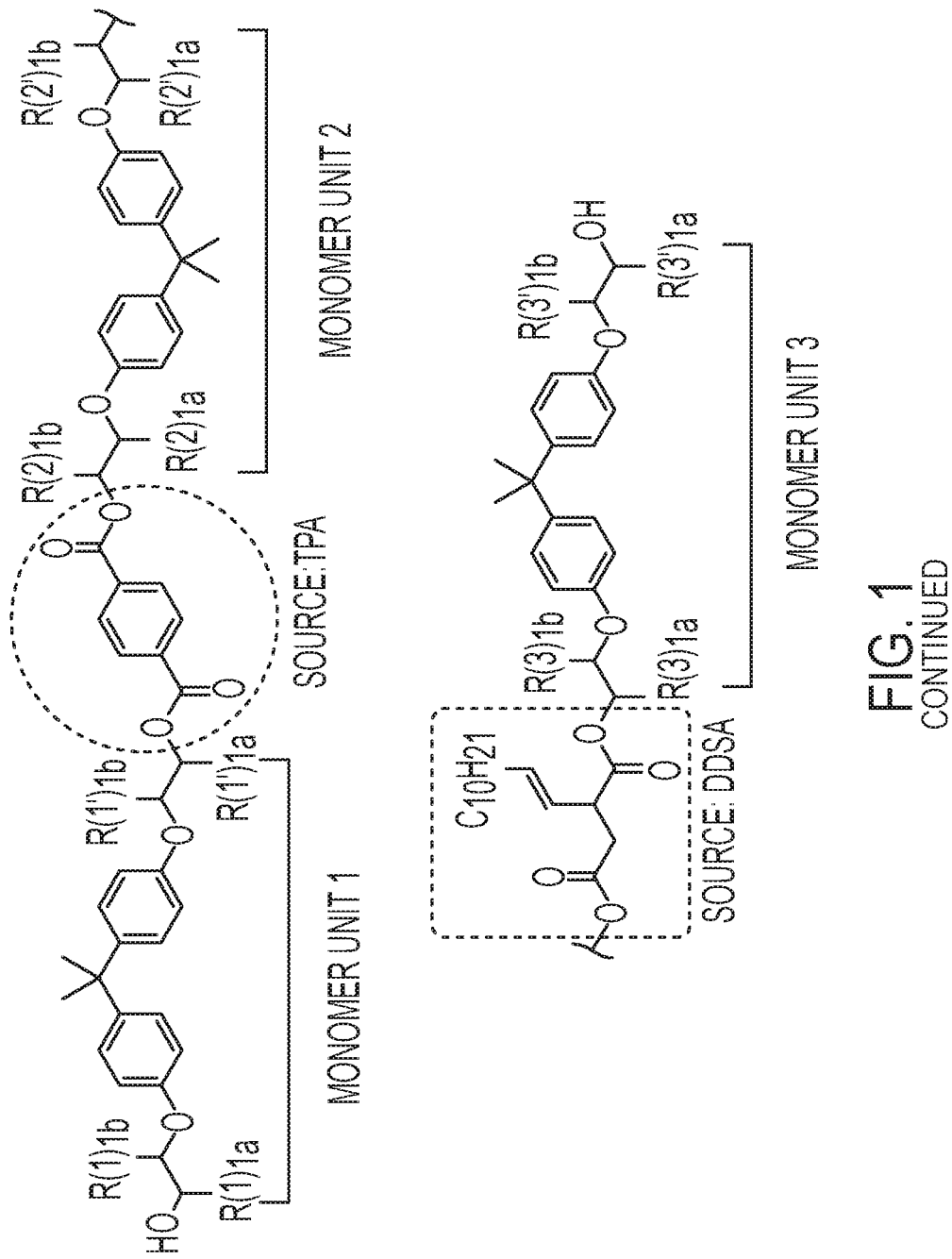
Figure 1:
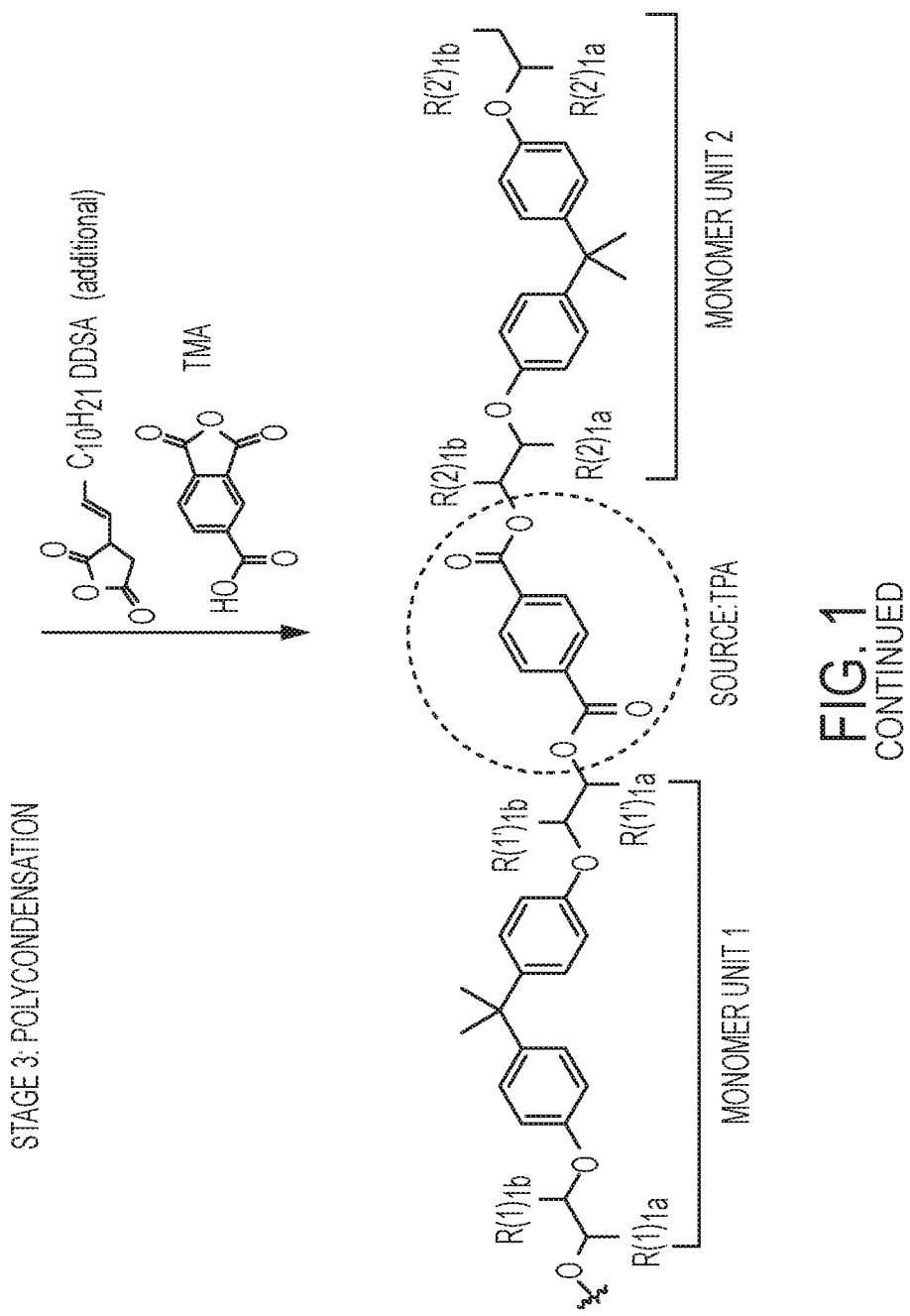
Figure 1:
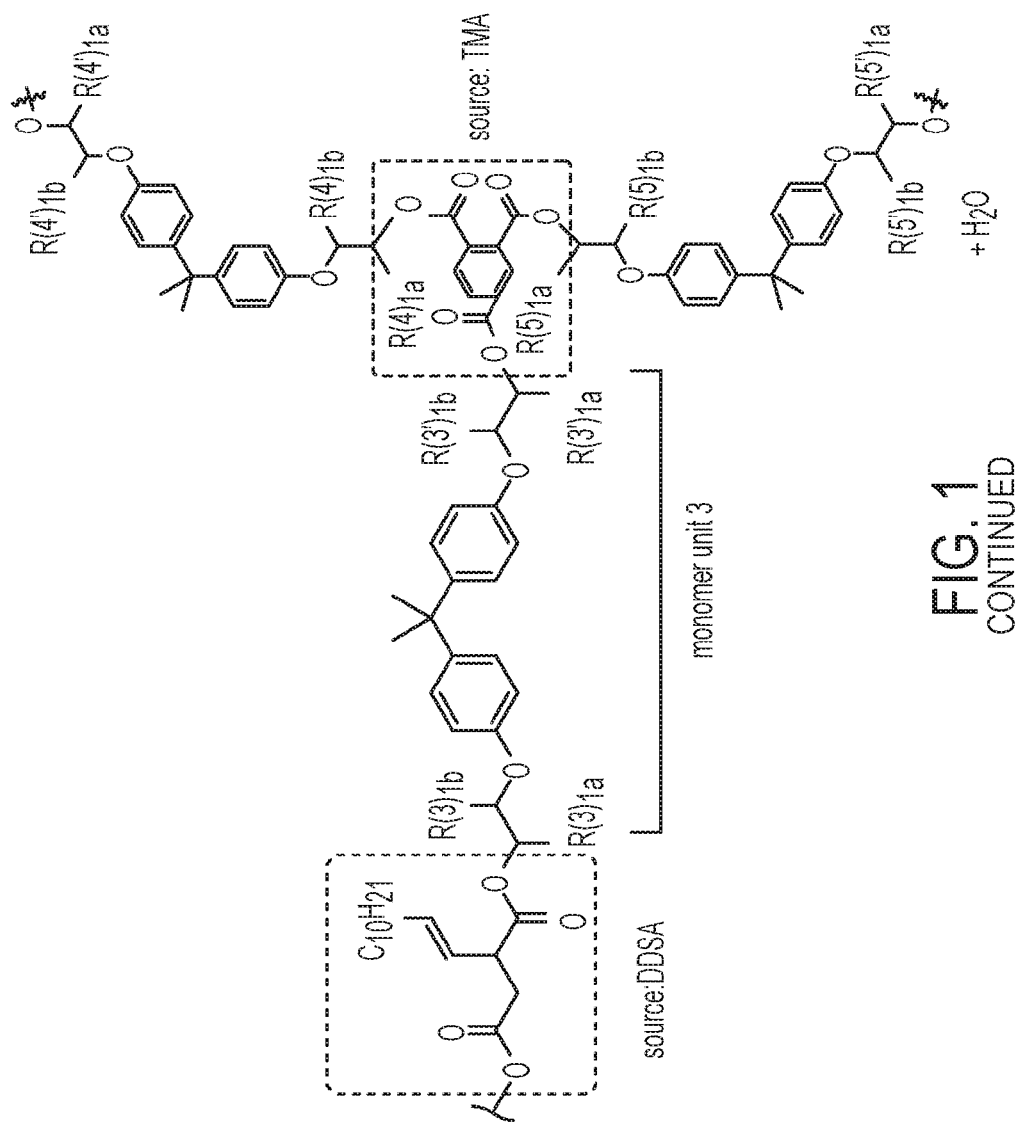

Herein is disclosed methods of producing branched polyester resins with a target glass transition temperature (Tg). The target Tg may be in the range from about 40° C. to about 80° C., from about 50° C. to about 70° C., from about 50° C. to about 62° C. In these methods, the molar ratio of the first cyclic alkylene carbonate to the second cyclic alkylene carbonate, the molar ratio of the first alkoxylated BPA monomer to the second alkoxylated BPA monomers, the molar ratio of the first diacid to the second diacid, or the combination thereof, can be used to adjust the Tg of the branched polyester resin.

The molar ratio of the first cyclic alkylene carbonate to the second cyclic alkylene carbonate may be adjusted to within the range of from 10:90 to 90:10, from 20:80 to 80:20, or from 25:75 to 80:20.

The molar ratio of the first alkoxylated BPA monomer to the second alkoxylated BPA monomers may be adjusted to within the range of from 10:90 to 90:10, from 20:80 to 80:20, or from 25:75 to 80:20.

The molar ratio of the first diacid to the second diacid may be adjusted to within the range of from 10:90 to 90:10, from 20:80 to 80:20, or from 30:70 to 70:30.

The branched polyester resins of the present embodiments can be synthesized in three steps, which include: stage 1: alkoxylation reaction; stage 2: esterification reaction; and stage 3: polycondensation.

Stage 1 can be carried out via a one-pot process, or a two-pot process. As used herein, the term "one-pot process" refers to a process comprising simultaneously or successively adding all reactants into a reactor to have them react together. In embodiments, the one-pot process involves the alkoxylation reaction of monomer bisphenol A (BPA) with a mixture of cyclic alkylene carbonates in the presence of a base to obtain a reaction mixture comprising two or more alkoxylated BPA monomers. The alkoxylation reaction may include reacting monomer bisphenol A (BPA) with a first cyclic alkylene carbonate in the presence of a first base to obtain a first alkoxylated BPA monomer. The alkoxylation reaction may include reacting monomer BPA with a second cyclic alkylene carbonate in the presence of a second base to obtain a second alkoxylated BPA monomer. The alkoxylation reaction may include reacting monomer bisphenol A (BPA) with a mixture of the first cyclic alkylene carbonate and the second cyclic alkylene carbonate to obtain a third alkoxylated BPA monomer. As used herein, the term "two-pot process" refers to a process comprising separately conducting two reactions in two separate reactors; the two reactions may take place concurrently, or at different times. In embodiments, the two-pot process involves the alkoxylation reaction of monomer BPA with a first cyclic alkylene carbonate in the presence of a first base to obtain a first alkoxylated BPA monomer, and the alkoxylation reaction of monomer BPA with a second cyclic alkylene carbonate in the presence of a second base to obtain a second alkoxylated BPA monomer, where these two alkoxylation reactions are carried out separately. (i.e., to be conducted in two separate pots). The alkoxylated BPA monomers are functionalized diols. The first and the second base may be the same or different.

Exemplary cyclic alkylene carbonates include propylene carbonate, ethylene carbonate, 1,2-butylene carbonate, trans-1,3-butylene carbonate, 1,3-propylene carbonate, trans-2,3-butylene carbonate, cis-2,3-butylene carbonate, or mixtures thereof. The molar ratio of the monomer bisphenol A to the mixture of cyclic alkylene carbonates may be from about 0.3 to about 2.5, from about 0.6 to about 2.4, or from about 0.8 to about 2.3.

In certain embodiments, the following scheme demonstrates the alkoxylation reaction carried out in a one-pot process when BPA reacts with a mixture of propylene carbonate and ethylene carbonate produces a mixture of dipropoxylated-BPA (2P-BPA), diethoxylated-BPA (2E-BPA) and propoxylated-ethoxylated-BPA (PE-BPA). The first alkoxylated BPA monomer may be 2P-BPA. The second alkoxylated BPA monomer may be 2E-BPA. The third alkoxylated BPA monomer may be PE-BPA.

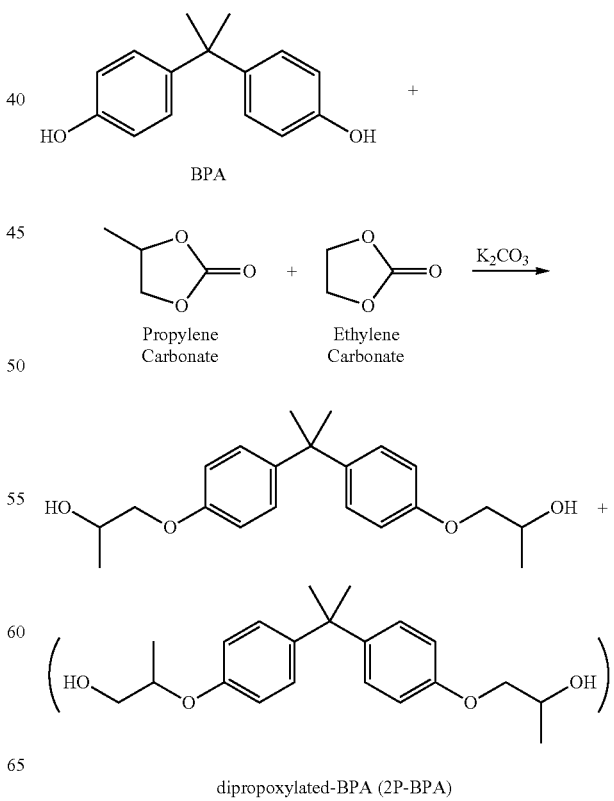

dipropoxylated-BPA (2P-BPA)

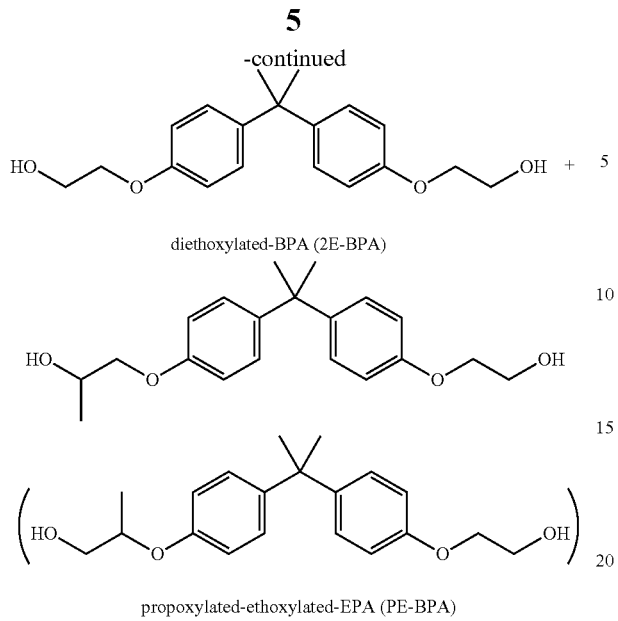

diethoxylated-BPA (2E-BPA)

propoxylated-ethoxylated-EPA (PE-BPA)

In certain embodiments, the following scheme demonstrates the alkoxylation reaction carried out in a two-pot process, which involves two separate alkoxylation reactions to produce a first alkoxylated diol, such as dipropoxylated-BPA, by reacting BPA with propylene carbonate in the presence of a base (e.g., potassium carbonate), a second alkoxylated diol, such as and diethoxylated-BPA, by reacting BPA with ethylene carbonate in the presence of a base (e.g., potassium carbonate), respectively. In the two-pot process, the two alkoxylation reactions take place at the same time.

Step 1.1—Alkoxylation to react BPA with propylene carbonate (PC) to form the alkoxylated diol, namely dipropoxylated-BPA (2P-BPA):

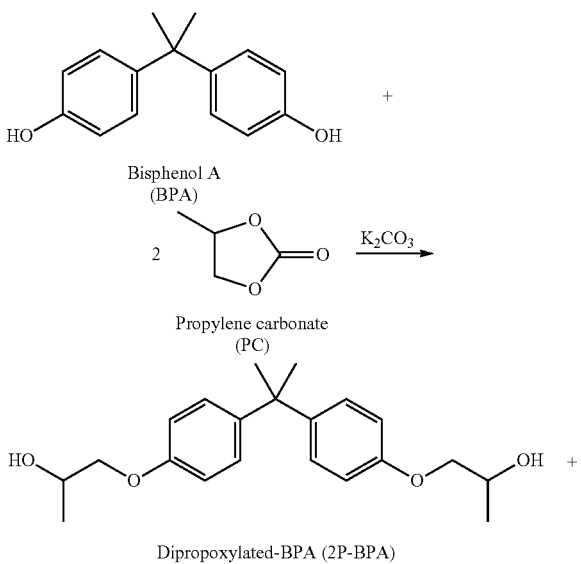

Step 1.2—Alkoxylation to react BPA with ethylene carbonate (EC) to form the alkoxylated diol, namely diethoxylated-BPA (2E-BPA):

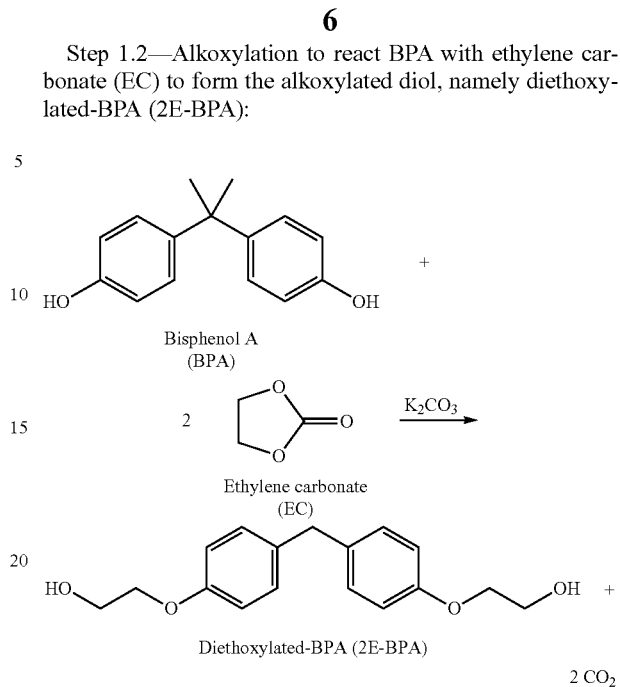

FIG. 1 (Stage 1 reaction scheme) demonstrates, in embodiments, a one-pot process reaction between BPA and a mixture of 5-membered ring cyclic alkylene carbonates (Note: mixtures of 6-membered ring cyclic alkylene carbonates or mixtures of 5- and 6-membered ring cyclic alkylene carbonates can be used in the present embodiments, but not shown in FIG. 1). FIG. 1 also demonstrates, in embodiments, a two-pot process reaction where BPA reacts separately with a first cyclic alkylene carbonate and a second cyclic alkylene carbonate. The first cyclic alkylene carbonate may be a substituted 5-membered ring cyclic alkylene carbonate (or a substituted 6-membered ring cyclic alkylene carbonate, not shown in FIG. 1). The second cyclic alkylene carbonate may be ethylene carbonate. $R_1$ represents lower alkyl, such as methyl, ethyl. $R_{1a}$ and $R_{1b}$ represent the location of $R_1$, as shown in the scheme, $R_{1a}$ represents $R_1$ group attached to the carbon atom adjacent to the terminal hydroxyl. $R_{1b}$ represents $R_1$ group attached to the carbon atom adjacent to the oxygen atom of the BPA. As shown in the scheme, the alkoxylated BPA monomers obtained from the alkoxylation reaction can be completely alkoxylated by one type of cyclic alkylene carbonate, or alkoxylated by a mixture of cyclic alkylene carbonates. The molar ratio of the alkoxylation reaction products (i.e., different alkoxylated BPA monomers) depends on the ratio of the different type of cyclic alkylene carbonates used.

In embodiments, the molar ratio the first alkoxylated BPA monomer to second alkoxylated BPA monomer can be from about 3:1 to about 1:3, from about 2:1 to about 1:2, or from about 1.5:1 to about 1:1.5. In embodiments, the molar ratio second alkoxylated BPA monomer to third alkoxylated BPA monomer can be from about 3:1 to about 1:3, from about 2:1 to about 1:2, or from about 1.5:1 to about 1:1.5. In embodiments, the molar ratio the first alkoxylated BPA monomer to third alkoxylated BPA monomer can be from about 3:1 to about 1:3, from about 2:1 to about 1:2, or from about 1.5:1 to about 1:1.5. In embodiments, the molar ratio the first alkoxylated BPA monomer to second alkoxylated BPA monomer to third alkoxylated BPA monomer can be from about 50:48:2 to about 70:20:10, or from about 55:40:5 to about 65:28:7. In embodiments, the molar ratio 2P-BPA to 2E-BPA can be from about 3:1 to about 1:3, from about 2:1 to about 1:2, or from about 1.5:1 to about 1:1.5. In embodiments, the molar ratio 2E-BPA to PE-BPA can be from about 3:1 to about 1:3, from about 2:1 to about 1:2, or from about 1.5:1 to about 1:1.5. In embodiments, the molar ratio 2P-BPA to PE-BPA can be from about 3:1 to about 1:3, from about 2:1 to about 1:2, or from about 1.5:1 to about 1:1.5. In embodiments, the molar ratio 2P-BPA to 2E-BPA to PE-BPA can be from about 50:48:2 to about 70:20:10, or from about 55:40:5 to about 65:28:7.

The alkoxylation reaction may be carried out under basic conditions with the addition of a base, examples being alkali metal hydroxides, alkali metal carbonates, alkali metal hydrogen carbonates, such as, potassium hydroxide, sodium hydroxide, potassium carbonate, potassium hydrogen carbonate, etc. in an amount between about 0.01 and about 0.5 weight percent, about 0.05 and about 0.3 weight percent, based on total reaction mixture. The by-product of the alkoxylation reaction is the liberation of carbon dioxide. The alkoxylation reaction may be effected at a temperature of between about 150° C. and about 200° C., or from about 160° C. and about 190° C. The alkoxylation reaction takes place over a period of from about 3 to about 7 hours, more usually from about 3.5 to about 6 hours. Upon completion of stage 1, the products of the alkoxylation reaction (i.e., alkoxylated BPA monomers) may be employed in the polyesterification reaction (Stage 2) without further purification. A diacid (or of mixtures of diacids) is then mixed with the alkoxylated BPA monomers in the presence of a catalyst to generate a copolymer.

The term "diacid" used herein, refers to compounds containing dicarboxylic acids or the source compounds of the dicarboxylic acids derived from (i.e., acid anhydrides).

Examples of diacid include dicarboxylic acids of terephthalic acid (TPA), phthalic acid, isophthalic acid, fumaric acid, maleic acid, succinic acid, itaconic acid, succinic acid, succinic anhydride, dodecenylsuccinic acid, dodecenylsuccinic anhydride (DDSA), glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecenylsuccinate, and mixtures thereof. In embodiments, the diacid may be used in the polyesterification reaction (Stage 2) include terephthalic acid, dodecenylsuccinic anhydride, or mixture thereof. The total diacids may be selected from about 45 to about 52 mole percent of total resin components. alkoxylated In embodiments, the mole percent range of the diacid is from about 35 to 55 mole percent, from 36 to 52 mole percent, or from about 45 to about 52 mole percent based on the total moles of the diacid and the alkoxylated BPA monomers (i.e., no. of mole of diacid+no. of mole of first alkoxylated BPA+no. of mole of second alkoxylated BPA).

In embodiments, the catalyst employed in the polyesterification reaction is tin-based. Such catalysts may be based on tin (II) or tin (IV) oxidation states. In embodiments, the tin-based catalyst are mono- or dialkyl tin-based. Monoalkyl tins may further comprise oxide and/or hydroxide groups at the tin atom. In embodiments, the tin-based catalyst comprises a mixture of monobutyltin oxide, monobutyltin hydroxide oxide, and butyl stannoic acid, commercially available as FASCAT® 4100. Other tin-based catalysts employed in transesterification chemistry are well-known in the art and can be used as well to prepare the copolymers herein, such as octabutyltetrathiocyanatostannoxane.

The polyesterification reaction (or copolymerizing step) may be effected at a temperature of between about 180° C. and about 250° C., or from about 200° C. and about 235° C. The alkoxylation reaction takes place over a period of from about 5 to about 15 hours, more usually from about 6 to about 12 hours. During the polyesterification reaction, water is generated which may be conveniently removed either by direct distillation or by the use of a binary azeotrope during the process.

The polyesterification reaction proceeds until the acid value of the copolymer product is <1.5 (or between 0.1 and 1.5), and the resin viscosity is between 2 and 10 poise or between 4 and 8 poise, and a softening temperature (Ts) of 95° C. is reached. In embodiments, the number average molecular weight (Mn) of the copolymer may be in a range from about 5,000 to about 100,000 grams per mole, or from about 10,000 to about 200,000 grams per mole.

As shown in FIG. 1 (Stage 2 reaction scheme), the monomer unit 1, 2, and 3 of the copolymer product of Stage 2 are originated from the alkoxylated BPA monomers of Stage 1. The alkoxylated BPA monomers of Stage 1 randomly react with diacid (may contain one or more types of diacid) to produce a copolymer, where the resulting copolymer may be a mixture of copolymers each of which is made up of a random combination of alkoxylated BPA monomer units and diacid units, where R(1)1a, R(1)1b, R(1')1a, R(1')1b, R(2)1a, R(2)1b, R(2')1a, R(2')1b, R(3)1a, R(3)1b, R(3')1a, R(3')1b . . . represent R1 at different locations of the copolymer. The number in the bracket indicates the location of the monomer, e.g., monomer unit 1, 2, 3 . . . .

In embodiments, the alkoxylated BPA monomer unit may be present in a range from about 40 to about 95 mole percent, from about 45 to about 90 mole percent, or from about 45 to about 85 mole percent of the copolymer.

Prior to Stage 3 polycondensation, the temperature of the reaction mixture may be lowered to about 150° C. to about 180° C., or about 170° C. In Stage 3, the polycondensation reaction proceeds at an elevated temperature with applied vacuum where the copolymer prepared from Stage 2 is condensed with an acid anhydride to form a branched resin. The acid anhydride employed for polycondensation includes a triacid or a tetraacid. Examples of triacid include, but are not limited to, trimellitic anhydride (TMA) and citric acid. Examples of tetraacid include, but are not limited to, tetrahydrophthalic anhydride. The term "trimellitic anhydride" encompasses substituted or unsubstituted trimellitic anhydride as well as the acid counterpart to trimellitic anhydride.

Additional diacid (e.g., DDSA) may be added along with the acid to control the degree of branching. The amount of diacid added during the condensation reaction (Stage 3) may be the same or less than the amount employed during the polyesterification reaction (Stage 2). The amount of diacid added during the condensation reaction may be from about 5 to about 50 mole percent or from 10 to about 45 mole percent or from 15 to about 45 mole percent of the copolymer.

The polycondensation reaction (or condensing step) may be effected at a temperature of between about 180° C. to about 250° C., or from about 200° C. and about 235° C., for a time period ranging from about 4 to about 20 hours, more usually from about 5 to about 12 hours. At this temperature range, the anhydride ring of the acid anhydride, e.g., trimellitic anhydride "opens" and the condensation reaction occurs between the trimellitic anhydride and the terminal hydroxyl functional group of the copolymer such that an ester bond is formed between the "opened" trimellitic anhydride and the coploymer. Moreover, the reaction between the trimellitic anhydride and the coploymer in the "condensation stage" also creates a carboxylic acid functional group on the "opened" trimellitic anhydride. Accordingly, the trimellitic anhydride will have two carboxylic acid functional groups that are available for further reaction. The two carboxylic acid functional groups of the open-ring trimellitic anhydride may then be reacted with additional copolymers via condensation reactions to produce a branched resin.

The resulting branched resin has an acid value of from about 8 mg KOH/g to about 14 mg KOH/g, a softening temperature (Ts) of from about 100° C. to about 140° C., and a glass transition temperature (Tg) of from about 35° C. to about 75° C. Acid number or acid value means the number of milligrams of potassium hydroxide required for neutralization of free acids present in 1 g of resin. The resulting branched resin has a number average molecular weight (Mn) in the range of from about 1,000 to about 20,000. The resulting branched resin has a weight average molecular weight (Mw) in the range of from about 25,000 to about 100,000. The branched resin of the present embodiments may be amorphous in nature.

Suitable viscosity measurements can be made using Brookfield Engineering Laboratories' Viscometer Model CAP 2000 H. Spindle #6 with operating temperature of 150° C. to 200° C. and about 750 rpm. The softening point (Ts) of the copolymer can be measured by using the cup and ball apparatus available from Mettler-Toledo as the FP90 softening point apparatus and using the Standard Test Method (ASTM) D-6090. The measurement can be conducted using a 0.50 gram sample and heated from 100° C. at a rate of 1° C./min.

EXAMPLES

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Example 1

Adjustment of the Ratio of Diacids in the Esterification Step

A series of copoly(propoxylated/ethoxylated bisphenol A-terephthlate-dodecenylsuccinic anhydride-trimellitic anhydride) resins were synthesized with diethoxylated-BPA (2E-BPA), dipropoxylated-BPA (2P-BPA), terephthalic acid (TPA), dodecenylsuccinic anhydride (DDSA), and trimellitic anhydride (TMA). To understand the effect of the content of DDSA on the property of the resin, the mole ratio of DDSA and TPA with respect to total diacid was varied to synthesize the resins in the range of 38.9 mole % to 48.2 mole % for DDSA with respect to total diacid, and 54.9 mole % to 45.8 mole % for TPA with respect to total diacid.

Figure 2:
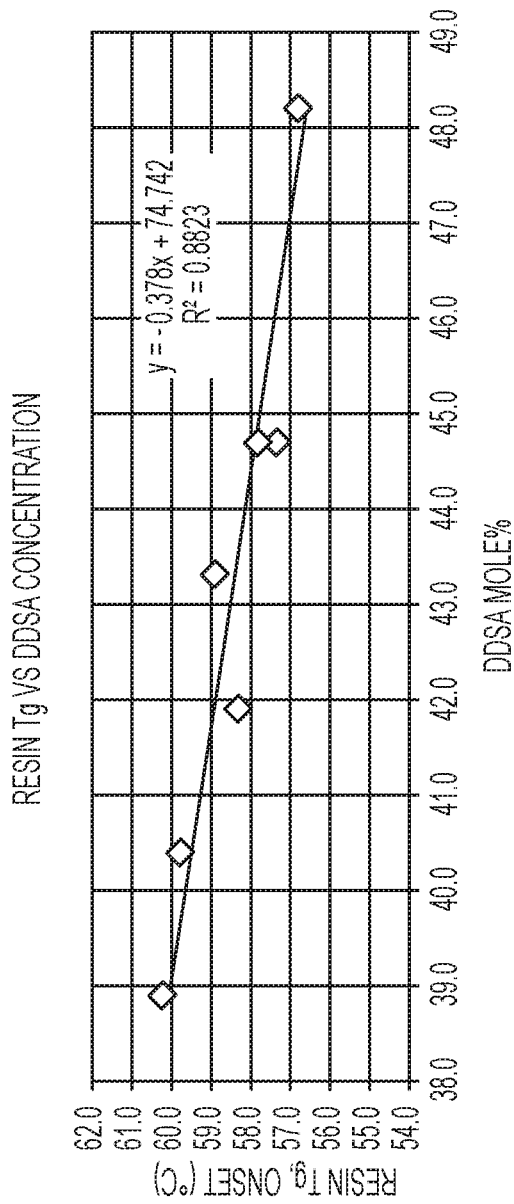
FIG. 2 demonstrates a linear correlation of the amount of DDSA with the resin Tg in accordance to certain embodiments of the present disclosure.

The compositions of each resin sample and the corresponding obtained glass transition temperature (Tg) are listed in Table 1 below. FIG. 2 demonstrates a linear correlation of the amount of DDSA with the resin Tg. The Tg decreased with the amount of DDSA in the resin formation, showing a strong correlation. This is due to the fact that DDSA introduces more flexible soft segments in the polymer chain and depresses the rigid hard segments attributed from TPA.

The amount of TMA used in Resin 1 was 6.15 mole % with respect to the total diacid used in the resin formulation. The amount of TMA was adjusted to 6.00 mole % for Resins 2-7. The minor change in the TMA content does not impact the resin Tg in this study. Upon varying the mole % of DDSA from about 36 mole % to about 50 mole %, the change in Tg is within an acceptable range, e.g., from about 50° C. to about 62° C., or from about 52° C. to about 60° C.

TABLE 1

| | | Dials (mole %) | | | Diacids (mole %) | | | | | Result |
| | | 2E-BPA | 2P-BPA | Total | TPA | DDSA | TMA | Total | | Tg(° C., |
| Method | Resin | | | | | | | | Process | onset) |
|---|---|---|---|---|---|---|---|---|---|---|
| Two-pot | Control | 15.0 | 85.0 | 100.0 | 54.9 | 38.9 | 6.15 | 100 | Epoxide | 56.3 |
| Two-pot | 1 | 15.0 | 85.0 | 100.0 | 54.9 | 38.9 | 6.15 | 100 | Carbonate | 60.2 |
| Two-pot | 2 | 15.0 | 85.0 | 100.0 | 53.6 | 40.4 | 6.00 | 100 | Carbonate | 59.7 |
| Two-pot | 3 | 15.0 | 85.0 | 100.0 | 52.2 | 41.9 | 6.00 | 100.1 | Carbonate | 58.3 |
| Two-pot | 4 | 15.0 | 85.0 | 100.0 | 50.7 | 43.3 | 6.00 | 100 | Carbonate | 58.9 |
| Two-pot | 5 | 15.0 | 85.0 | 100.0 | 49.3 | 44.7 | 6.00 | 100 | Carbonate | 57.3 |
| Two-pot | 6 | 15.0 | 85.0 | 100.0 | 49.3 | 44.7 | 6.00 | 100 | Carbonate | 57.8 |
| Two-pot | 7* | 15.0 | 85.0 | 100.0 | 45.8 | 48.2 | 6.00 | 100 | Carbonate | 56.8 |

*Resin 7 can be produced with one-pot process according to the present embodiments Control Resin The Control resin that was prepared with 15 mole % of 2E-BPA and 85 mole ° A) of 2P-BPA of total diols and showed a glass transition temperature of 56.3° C. (DSC, 2nd scan, onset). The Control resin that was prepared using an epoxide process described in U.S. Pat. No. 8,288,499 B2 entitled Polyester for Toner. at columns 9 and 10, incorporated herein by reference. Into a reactor equipped with stirring and controlled temperature was charged 228 g (1 mole) of bisphenol A and 2 g of potassium hydroxide. Ethylene oxide (2 moles) was introduced at 135° C. under pressure ranging from 0.1 to 0.4 MPa and the mixture was reacted for 3 hours. To this reaction product was added 16 g of magnesium oxide-silica oxide absorbent Kyoward 600 and the mixture was stirred at 90° C. for 30 minutes. Thereafter, the resulting mixture was filtered to give the ethoxylated bisphenol A adduct.

Into a separate reactor equipped with stirring and controlled temperature was charged 238 g (1 mole) of bisphenol A and 2 g of potassium hydroxide. Propylene oxide (2 moles) was introduced at 135° C. under pressure ranging from 0.1 to 0.4 MPa and subjected to additional 3 hours for reaction. To the resulting product was added 16 g of magnesium oxide-silica oxide absorbent Kyoward 600 and the mixture was stirred at 90° C. for 30 minutes. Thereafter, the resulting mixture was filtered to give the propoxylated bisphenol A adduct.

Into a separate reactor equipped with a nitrogen inlet tube, a dehydration tube, a stirrer and thermocouple was charge ethoxylated bisphenol A adduct, propoxylated bisphenol A adduct in the desired ratios, with terephthalic acid and a tin catalyst. The ingredients were reacted at 230° C. over a period of 8 hours and the further reacted under vacuum at 8.3 kPa for 1 hour. Further trimellitic acid was added at 210° C. and reacted under pressure (101.3 kPa) for 1 hour then a further time at 8.3 kPa until the resin met the desired softening point. This resin was used to make toner particles.

Resin 1 includes 15 mole % of 2E-BPA and 85 mole % of 2P-BPA of the total diol, and 54.9 mole % of terephthalic acid, 38.9 mole % of dodecenylsuccinic anhydride, and 6.15 mole % of trimellitic anhydride of the total diacid. Resins 1-7 were prepared according to the two-pot process of the present embodiments.

Resin 1:
Synthesis at 1 Liter Scale with the Formulation of 15 Mole % of 2E-BPA, 85 Mole % of 2P-BPA for the Diol Components, 54.3 Mole % of TPA, 38.9 Mole % of DDSA, and 6.15 Mole % of TMA as the Diacid Components Stage 1.1 Propoxylation of BPA to Form Dipropoxylated-BPA
Dipropoxylated-BPA was produced by reacting bisphenol A with propylene carbonate in the presence of potassium carbonate at 5 gallon scale at elevated temperature.

Stage 1.2 Ethoxylation of BPA to Form Diethoxylated-BPA
Diethoxylated-BPA was produced by reacting bisphenol A with ethylene carbonate in the presence of potassium carbonate at 5 gallon scale at elevated temperature.

Stage 2: Esterification and Pre-Polycondensation
A 1-liter glass resin kettle equipped with a mechanical stirrer, inlet for introducing nitrogen, a temperature probe, and a water cooled condenser was charged with 371.8 g of 2P-BPA, 60.3 g of 2E-BPA, 121.7 g of TPA, 136.5 g of DDSA, and 1.39 g of Fascat 4100 and heated to 200° C. with stirring under a nitrogen atmosphere. The reactor was blanketed with nitrogen after the raw material addition and during temperature ramp up. At 190° C. reactor temperature, taking this point as time zero for esterification reaction, the by-product water of the reaction starts to be produced and subsequently removed from the reactor. No nitrogen blanketing was necessary at this step. The reaction temperature was maintained at 200° C. for 1.5 hours. After 1.5 hours, nitrogen purge resumed and reactor temperature was set from 200° C. to 230° C. for a period of 6 hours. Then the reactor temperature was lowered to 170° C. for step 3.

Stage 3: Polycondensation
Following the completion of step 2, the glass kettle was charged with 15.6 g of TMA and heated to 230° C. with nitrogen sparging. Resin samples were taken during the reaction to monitor the softening point (or viscosity) and acid value. Once the target softening point and acid value were achieved, the synthesized resin was discharged and cooled down. The obtained resin had a glass transition temperature of 60.2° C. measured by DSC (second scan, onset).

Resin 2:
Synthesis at 1 Liter Scale with the Formulation of 15 Mole % of 2E-BPA and 85 Mole % of 2P-BPA of the Total Diol, 53.6 Mole % of TPA, 40.4 Mole % of DDSA, and 6.0 Mole % of TMA of the Total Diacid This batch was prepared using the same procedure as described in the preparation of Resin 1 except for the changes in the raw material loadings as specified. During the esterification stage the glass resin kettle was charged with 371.8 g of 2P-BPA, 60.3 g of 2E-BPA, 127.6 g of TPA, 152.4 g of DDSA, and 1.50 g of Fascat 4100 and heated to 200° C. Upon completion of stage 2, the glass kettle was charged with 16.3 g of TMA and heated to 230° C. with the nitrogen sparging. The final resin had a glass transition temperature of 59.7° C. measured by DSC (second scan, onset).

Resin 3:
Synthesis at 1 Liter Scale with the Formulation of 15 Mole % of 2E-BPA and 85 Mole % of 2P-BP of Total Diol, 52.2 Mole % of TPA, 41.9 Mole % of DDSA, and 6.0 Mole % of TMA of Total Diacid This batch was prepared using the same procedure as described in the preparation of Resin 1 except for the changes in the raw material loadings as specified. During the esterification stage the glass resin kettle was charged with 371.8 g of 2P-BPA, 60.3 g of 2E-BPA, 124.2 g of TPA, 157.7 g of DDSA, and 1.50 g of Fascat 4100 and heated to 200° C. Upon completion of stage 2, the glass kettle was charged with 16.3 g of TMA and heated to 230° C. with nitrogen sparging. The final resin had a glass transition temperature of 58.3° C. measured by DSC (second scan, onset).

Resin 4:
Synthesis at 1 Liter Scale with the Formulation of 15 Mole % of 2E-BPA and 85 Mole % of 2P-BPA of Total Diol, 50.7 Mole % of TPA, 43.3 Mole % of DDSA, and 6.0 Mole % of TMA of Total Diacid This batch was prepared using the same procedure as described in the preparation of Resin 1 except for the changes in the raw material loadings as specified. During the esterification stage the glass resin kettle was charged with 371.8 g of 2P-BPA, 60.3 g of 2E-BPA, 120.9 g of TPA, 163.1 g of DDSA, and 1.50 g of Fascat 4100 and heated to 200° C. Upon completion of stage 2, the glass kettle was charged with 16.3 g of TMA and heated to 230° C. with the nitrogen sparging. The final resin product had a glass transition temperature of 58.9° C. measured by DSC (second scan, onset).

Resin 5:
Synthesis at 1 Liter Scale with the Formulation of 15 Mole % of 2E-BPA and 85 Mole % of 2P-BPA of Total Diol, 49.3 Mole % of TPA, 44.7 Mole % of DDSA, and 6.0 Mole % of TMA of Total Diacid This batch was prepared using the same procedure as described in the preparation of Resin 1 except for the changes in the raw material loadings as specified. During the esterification stage the glass resin kettle was charged with 371.8 g of 2P-BPA, 60.3 g of 2E-BPA, 117.5 g of TPA, 168.4 g of DDSA, and 1.50 g of Fascat 4100 and heated to 200° C. Upon completion of stage 2, the glass kettle was charged with 16.3 g of TMA and heated to 230° C. with the nitrogen sparging. The final resin had a glass transition temperature of 57.3° C. measured by DSC (second scan, onset).

Resin 6:
Synthesis at 1 Liter Scale with the Formulation of 15 Mole % of 2E-BPA and 85 Mole % of 2P-BPA of Total Diol, 49.3 Mole % of TPA, 44.7 Mole % of DDSA, and 6.0 Mole % of TMA of Total Diacid This batch was prepared using the same formulation and procedure as described in the preparation of Resin 5. The final resin had a glass transition temperature of 57.8° C. measured by DSC (second scan, onset).

13

Resin 7:

Synthesis at 1 Liter Scale with the Formulation of 15 Mole % of 2E-BPA and 85 Mole % of 2P-BPA of Total Diol, 45.8 Mole % of TPA, 48.2 Mole % of DDSA, and 6.0 Mole % of TMA of Total Diacid

14 amount of 2E-BPA or ethylene carbonate with the resin Tg. With increasing the 2E-BPA or ethylene carbonate in the formulation, the resin Tg decreases due to the reduction of the side chain that was attributed from the 2P-BPA or propylene carbonate.

TABLE 2

| Method | Experiment I.D. | Diols (carbonate esters) (mole %) | | | Diacids (mole %) | | | | Process | Result Tg(° C., onset) 54.5-58.0 C. |
|---|---|---|---|---|---|---|---|---|---|---|
| | | 2E-BPA (EC) | 2P-BPA (PC) | Total | TPA | DDSA | TMA | Total | | |
| Two-pot | Control | 15.0 | 85.0 | 100.0 | 54.9 | 38.9 | 6.15 | 100 | Epoxide | 56.3 |
| Two-pot | 1 | 15.0 | 85.0 | 100.0 | 54.9 | 38.9 | 6.15 | 100 | Carbonate | 60.2 |
| Two-pot | 8 | 20.0 | 80.0 | 100.0 | 55.0 | 39.0 | 6.00 | 100 | Carbonate | 59.6 |
| Two-pot | 9 | 50.0 | 50.0 | 100.0 | 55.0 | 39.0 | 6.00 | 100 | Carbonate | 58.1 |
| One-pot | 10 | (22.5) | (77.5) | 100.0 | 54.9 | 38.9 | 6.15 | 100 | Carbonate | 60.3 |
| One-pot | 11 | (36.0) | (64.0) | 100.0 | 54.9 | 38.9 | 6.15 | 100 | Carbonate | 59.3 |
| One-pot | 12 | (50.0) | (50.0) | 100.0 | 54.9 | 38.9 | 6.15 | 100 | Carbonate | 57.5 |
| One-pot | 13 | (64.0) | (36.0) | 100.0 | 54.9 | 38.9 | 6.15 | 100 | Carbonate | 56.8 |
| One-pot | 14 | (73.0) | (27.0) | 100.0 | 54.9 | 38.9 | 6.15 | 100 | Carbonate | 55.6 |
| One-pot | 15 | (77.5) | (22.5) | 100.0 | 54.9 | 38.9 | 6.15 | 100 | Carbonate | 54.7 |
| One-pot | 16 | (77.5) | (22.5) | 100.0 | 54.9 | 38.9 | 6.15 | 100 | Carbonate | 54.3 |

This batch was prepared using the same procedure as described in the preparation of Resin 1 except for the changes in the raw material loadings as specified. During the esterification stage the glass resin kettle was charged with 371.8 g of 2P-BPA, 60.3 g of 2E-BPA, 109.1 g of TPA, 181.7 g of DDSA, and 1.50 g of Fascat 4100 and heated to 200° C. Upon completion of stage 2, the glass kettle was charged with 16.3 g of TMA and heated to 230° C. with the nitrogen sparging. The final resin product had a glass transition temperature of 56.8° C. measured by DSC (second scan, onset).

Example 2

Adjustment of the Ratio of Alkoxylated Diols or the Ratio of Carbonate Esters

Another series of the copoly(propoxylated/ethoxylated bisphenol A-terephthalate-dodecenylsuccinic anhydride-trimellitic anhydride) resins were synthesized at 1 liter scale to investigate the resin Tg by varying the ratios of the alkoxylated diols in the esterification reaction with the two-pot process or changing the ratio of carbonate esters in the alkoxylation reaction with the one-pot process. The ratio of the diacids remained the same as 54.9 mole % of TPA, 38.9 mole % of DDSA, and 6.15 mole % of TMA based on total mole percent of the total diacids in esterification stage.

Figure 3:
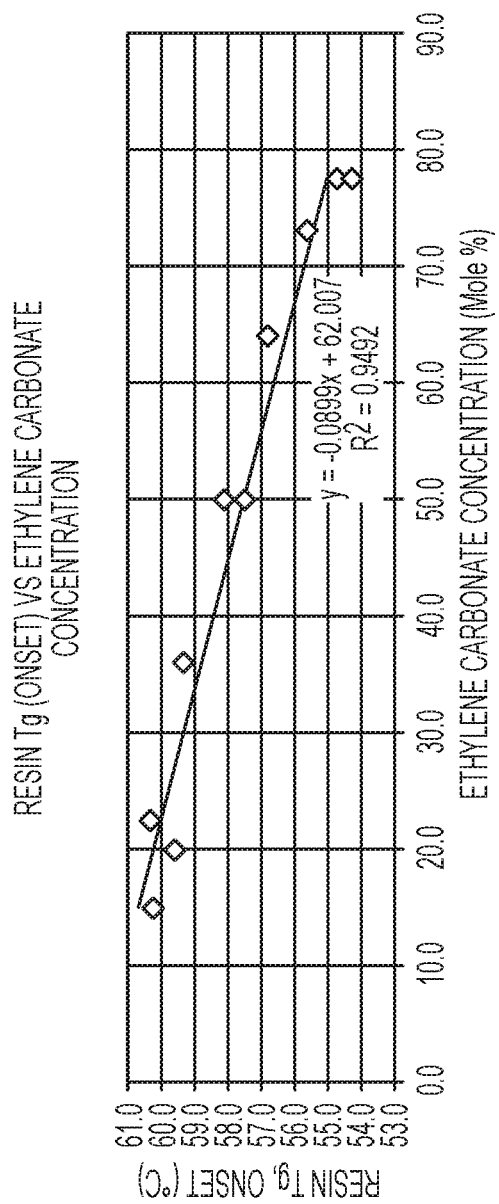
FIG. 3 demonstrates a linear correlation of the amount of 2E-BPA or ethylene carbonate with the resin Tg in accordance to certain embodiments of the present disclosure.

Two samples (Resins 8 and 9) were prepared via the two-pot process of the present embodiments. Resin 8 was prepared with 20 mole % of 2E-BPA and 80 mole % of 2P-BPA. Resin 9 was prepared with 50 mole % of 2E-BPA and 50 mole % of 2P-BPA. Seven resin samples (Resins 10-16) were prepared via the one-pot process of the present embodiments. These resins were prepared by varying the ratio of carbonate esters in the range of 22.5 mole % to 77.5 mole % for ethylene carbonate and 77.5 mole % to 22.5 mole % for propylene carbonate. The compositions of each formulation and resin Tg are listed in Table 2. The Tg data obtained from two-pot and one-pot processes are plotted together in FIG. 3 which shows a linear correlation of the Resin 8:

Synthesis at 1 Liter Scale with the Formulation of 20 Mole % of 2E-BPA and 80 Mole % of 2P-BPA of Total Diol, 55.0 Mole % of TPA, 39.0 Mole % of DDSA, and 6.0 Mole % of TMA of Total Diacid This batch was prepared using the same procedure as described in the preparation of Resin 1 except for the changes in the raw material loadings as specified. During the esterification stage the glass resin kettle was charged with 350.0 g of 2P-BPA, 80.4 g of 2E-BPA, 131.0 g of TPA, 147.1 g of DDSA, and 1.50 g of Fascat 4100 and heated to 200° C. Upon completion of stage 2, the glass kettle was charged with 16.3 g of TMA and heated to 230° C. with the nitrogen sparging. The final resin had a glass transition temperature of 59.6° C. measured by DSC (second scan, onset).

Resin 9:

Synthesis at 1 Liter Scale with the Formulation of 50 Mole % of 2E-BPA and 50 Mole % of 2P-BPA of Total Diol, 55.0 Mole % of TPA, 39.0 Mole % of DDSA, and 6.0 Mole % of TMA of Total Diacid This batch was prepared using the same procedure described in the preparation of Resin 1 except for the changes in the raw material loadings as specified. During the esterification stage the glass resin kettle was charged with 218.7 g of 2P-BPA, 200.9 g of 2E-BPA, 131.0 g of TPA, 147.1 g of DDSA, and 1.50 g of Fascat 4100 and heated to 200° C. Upon completion of stage 2, the glass kettle was charged with 16.3 g of TMA and heated to 230° C. with the nitrogen sparging. The final resin had a glass transition temperature of 58.1° C. measured by DSC (second scan, onset).

Resin 10:

Synthesis at 1 Liter Scale with the Formulation of 22.5 Mole % of Ethylene Carbonate and 77.5 Mole % of Propylene Carbonate of Total Carbonate Reagents, 54.9 Mole % of TPA, 38.9 Mole % of DDSA, and 6.15 Mole % of TMA of Total Diacids Stage 1: Alkoxylation to Form Diethoxylated-BPA, Dipropoxylated-BPA, and a Mixture of Propoxylated-Ethoxylated-BPA A 1-liter glass resin kettle equipped with a mechanical stirrer, inlet for introducing nitrogen, a temperature probe, and a water cooled condenser was charged with 350 g of Bisphenol A, 60.1 g of ethylene carbonate, 263.9 g of propylene carbonate, 0.73 g of potassium carbonate and heated to 185° C. The reactor was blanketed with nitrogen after the raw material addition and during the temperature ramp and the reaction. The reaction by-product, carbon dioxide, evolved when the reactor temperature reached 155-160° C. and subsequently removed from the reactor. Nitrogen purge was used as needed for the first 2 hours of reaction time and then was resumed for the last 2.5 hours. The reaction temperature was maintained at 185° C. with stirring for a period of 4.5 hours, to yield a light yellow viscous product. A sample was taken to monitor the residual BPA by proton NMR to ensure complete reaction of the BPA.

Stage 2: Esterification and Precondensation

Following the completion of step 1, the glass kettle was charged with 157.9 g of terephthalic acid, 177.0 g of dodecenylsuccinic anhydride, and 1.81 g of Fascat 4100 catalyst and heated to 200° C. with stirring under a nitrogen atmosphere. At 190° C. reactor temperature, taking time zero for esterification reaction, the reaction by-product water starts to be produced and subsequently removed from the reactor. The reaction temperature was maintained at 200° C. for 1.5 hours. No nitrogen blanketing was necessary at this step. After 1.5 hours, nitrogen purge was resumed and reactor temperature was set from 200° C. to 215° C. for a period of 4.5 hours, from 215° C. to 220° C. for 2 hours, from 220° C. to 225° C. for 1 hour, from 225° C. to 230° C. for 1 hour (or long, maximum at 235° C.) to achieve an acid value less than 1.5 mg KOH/g of resin. When the target acid value was reached, the reactor temperature was lowered to 170° C. for step 3.

Stage 3: Polycondensation

Following the completion of step 2, the glass kettle was charged with 20.19 g of TMA and heated to 235° C. with the nitrogen purge. When the resin softening point was reached 115.3° C., the mixture was transferred from the glass kettle to 1-liter Parr reactor and the polycondensation continued. The temperature in the Parr reactor was set to 235° C. with stirring and low vacuum was applied at the beginning. A full vacuum was applied in the next couple of hours to reach the target softening point. The synthesized resin was discharged and cooled down. The obtained resin had a glass transition temperature of 60.3° C. measured by DSC (second scan, onset).

Resin 11:

Synthesis at 1 Liter Scale with the Formulation of 36 Mole % of Ethylene Carbonate and 64 Mole % of Propylene Carbonate of Total Carbonate, 54.9 Mole % of TPA, 38.9 Mole % of DDSA, and 6.15 Mole % of TMA of Total Diacid This batch was prepared using the same procedure in the example Resin 10 except for the changes in the raw material loadings as specified. During the alkoxylation stage the glass resin kettle was charged with 350 g of Bisphenol A, 105.7 g of ethylene carbonate, 217.9 g of propylene carbonate, 0.73 g of potassium carbonate. In the esterification stage, the glass kettle was charged with 162.7 g of TPA, 182.35 g of DDSA and 1.86 g of Fascat 4100. Upon completion of stage 2, the glass kettle was charged with 20.8 g of TMA and heated to 235° C. with the nitrogen sparging. The final resin had a glass transition temperature of 59.3° C. measured by DSC (second scan, onset).

Resin 12:

Synthesis at 1 Liter Scale with the Formulation of 50 Mole % of Ethylene Carbonate and 50 Mole % of Propylene Carbonate of Total Carbonate, 54.9 Mole % of TPA, 38.9 Mole % of DDSA, and 6.15 Mole % of TMA of Total Diacid This batch was prepared using the same procedure as described in the preparation of Resin 10 except for the changes in the raw material loadings as specified. During the alkoxylation stage the glass resin kettle was charged with 350 g of Bisphenol A, 146.9 g of ethylene carbonate, 170.3 g of propylene carbonate, 0.73 g of potassium carbonate. In the esterification stage, the glass kettle was charged with 162.7 g of TPA, 182.35 g of DDSA, and 1.86 g of Fascat 4100. Upon completion of stage 2, the glass kettle was charged with 20.8 g of TMA and heated to 235° C. with the nitrogen sparging. The final resin had a glass transition temperature of 57.5° C. measured by DSC (second scan, onset).

Resin 13:

Synthesis at 1 Liter Scale with the Formulation of 64 Mole % of Ethylene Carbonate and 36 Mole % of Propylene Carbonate of Total Carbonate, 54.9 Mole % of TPA, 38.9 Mole % of DDSA, and 6.15 Mole % of TMA of Total Diacid This batch was prepared using the same procedure as described in the preparation of Resin 10 except for the changes in the raw material loadings as specified. During the alkoxylation stage the glass resin kettle was charged with 350 g of Bisphenol A, 188.0 g of ethylene carbonate, 122.6 g of propylene carbonate, 0.73 g of potassium carbonate. In the esterification stage, the glass kettle was charged with 162.7 g of TPA, 182.35 g of DDSA, and 1.86 g of Fascat 4100. Upon completion of stage 2, the glass kettle was charged with 20.8 g of TMA and heated to 235° C. with the nitrogen sparging. The final resin had a glass transition temperature of 56.8° C. measured by DSC (second scan, onset).

Resin 15:

Synthesis at 1 Liter Scale with the Formulation of 77.5 Mole % of Ethylene Carbonate and 22.5 Mole % of Propylene Carbonate of Total Carbonate, 54.9 Mole % of TPA, 38.9 Mole % of DDSA, and 6.15 Mole % of TMA of Total Diacid This batch was prepared using the same procedure as described in the preparation of Resin 10 except for the changes in the raw material loadings as specified. During the alkoxylation stage the glass resin kettle was charged with 350 g of Bisphenol A, 227.7 g of ethylene carbonate, 76.6 g of propylene carbonate, 0.73 g of potassium carbonate. In the esterification stage, the glass kettle was charged with 162.7 g of TPA, 182.35 g of DDSA, and 1.86 g of Fascat 4100. Upon completion of stage 2, the glass kettle was charged with 20.8 g of TMA and heated to 235° C. with the nitrogen sparging. The final resin had a glass transition temperature of 54.7° C. measured by DSC (second scan, onset).

Resin 16:

Synthesis at 1 Liter Scale with the Formulation of 77.5 Mole % of Ethylene Carbonate and 22.5 Mole % of Propylene Carbonate of Total Carbonate, 54.9 Mole % of TPA, 38.9 Mole % of DDSA, and 6.15 Mole % of TMA of Total Diacid This batch was prepared using the same formulation and procedure as described in the preparation of Resin 15. The final resin had a glass transition temperature of 54.3° C. measured by DSC (second scan, onset).

Resin 14:

Synthesis at 1 Liter Scale with the Formulation of 73.0 Mole % of Ethylene Carbonate and 27.0 Mole % of Propylene Carbonate of Total Carbonate, 54.9 Mole % of TPA, 38.9 Mole of DDSA, and 6.15 Mole % of TMA of Total Diacid This batch was prepared using the same procedure as described in the preparation of Resin 10 except for the changes in the raw material loadings as specified. During the alkoxylation stage the glass resin kettle was charged with 350 g of Bisphenol A, 214.4 g of ethylene carbonate, 91.9 g of propylene carbonate, 0.73 g of potassium carbonate.

Figure 4:
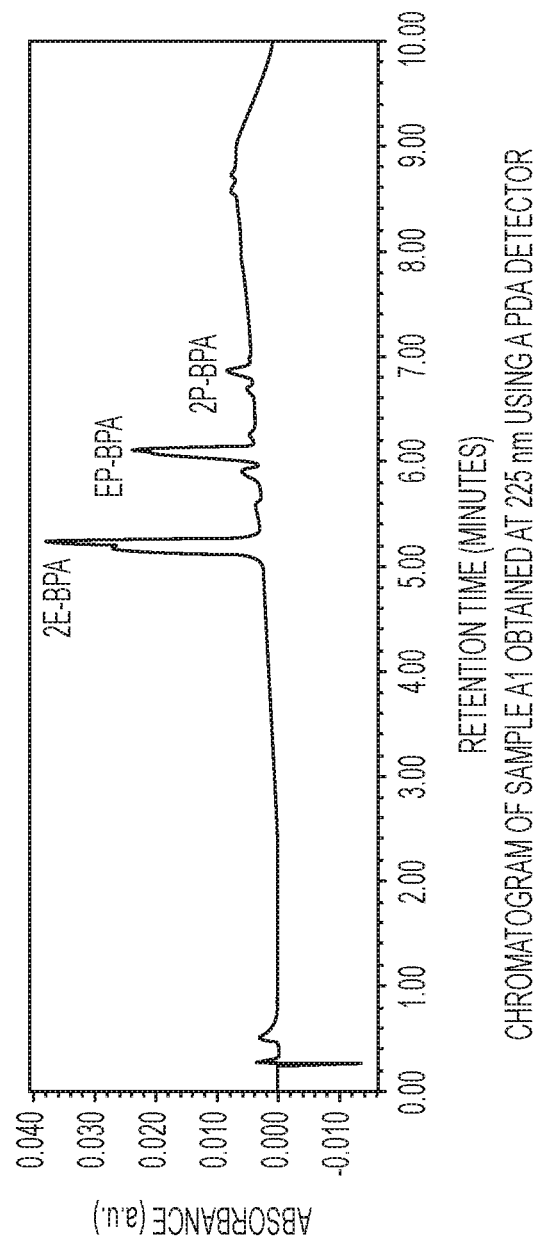
FIG. 4 is a chromatogram of an intermediate sample A1 taken during the alkoxylation reaction (stage 1) obtained at 225 nm in accordance to certain embodiments of the present disclosure.
Figure 5:
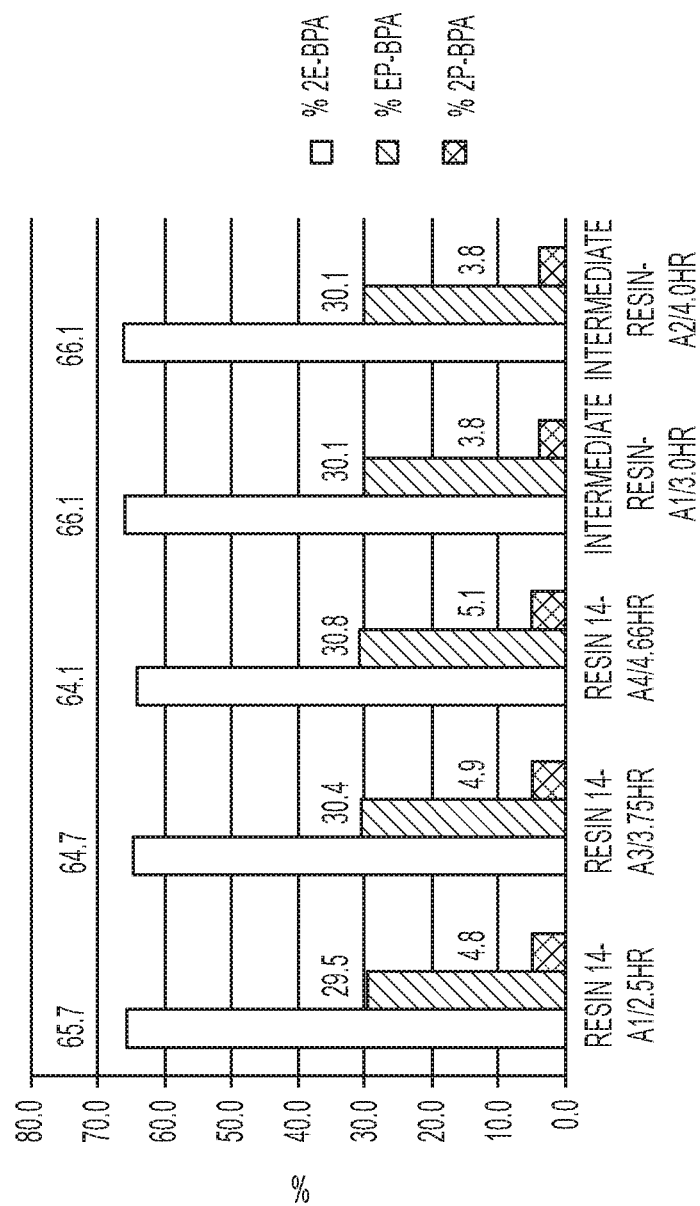
FIG. 5 shows the concentration of derivatives (2E-BPA, PE-BPA, 2P-BPA) in accordance to certain embodiments of the present disclosure.

A series of the intermediate samples (A1, A2, A3, and A4) were taken during the alkoxylation reaction (stage 1) at 2.5, 3.0, 3.75, and 4.66 hours. The samples (A1, A3, and A4) were characterized by Liquid Chromatography-Mass Spectrometry LC-MS to determine and quantify the three alkoxylated BPA derivatives and residual BPA based on photodiode array detector PDA chromatographic peak area. The PDA chromatogram showed three dominant peaks with similar retention times to 2E-BPA and 2P-BPA in the standard mix as shown in FIG. 4. The third peak eluted between the 2E-BPA and 2P-BPA peaks, was identified to be PE-BPA. The retention time for each component was 5.234, 6.105 and 6.865 minutes for 2E-BPA, PE-BPA and 2P-BPA, respectively. No BPA peak was presented in the PDA chromatogram above the detection limit of 80 ppb. Additional minor peaks were observed in the PDA chromatogram, but were not identified. All intermediate samples showed a concentration trend of 2E-BPA>PE-BPA>2P-BPA, with PE-BPA being 29.5-30.8 wt. % of the starting sample mass. The concentration for each derivative was plotted in FIG. 5.

Figure 6:
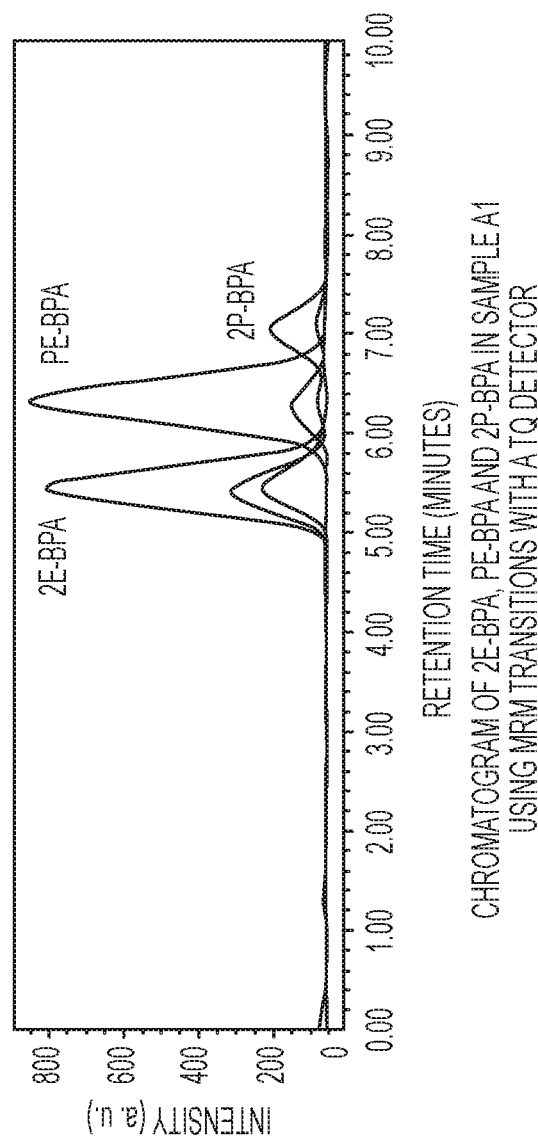
FIG. 6 is a chromatogram of 2E-BPA, PE-BPA, 2P-BPA in an intermediate sample A1 using MRM transitions with a TQ detector.

The identification of 2E-BPA, EP-BPA and 2P-BPA was also confirmed by multiple reaction monitoring (MRM) using a tandem quadrupole (TQ) mass spectrometer as shown in FIG. 6. Each alkoxylated BPA derivative was observed to have three unique product ions resulting from the MRM fragmentation of either ethoxylated or propoxylated moieties or both from the corresponding parent ion masses (2E-BPA=315.17 Da, EP-BPA=329.17 Da and 2P-BPA=343.17 Da).

The sample A4 (at 4.66 hours) was submitted to monitor the residual BPA by proton NMR to ensure the complete reaction of the starting material BPA.

In the esterification stage, the glass kettle was charged with 162.7 g of TPA, 182.8 g of DDSA, and 1.86 g of Fascat 4100. Upon completion of stage 2, the glass kettle was charged with 20.8 g of TMA and heated to 235° C. with the nitrogen sparging. The final resin had a glass transition temperature of 55.6° C. measured by DSC (second scan, onset).

Intermediate Resin:

Synthesis of Intermediate at 1 Liter Scale with the Formulation of 73.0 Mole % of Ethylene Carbonate and 27.0 Mole % of Propylene Carbonate for the Alkoxylation Stage Only This batch was prepared using the same procedure and formulation as described in the preparation of Resin 14. During the alkoxylation stage the glass resin kettle was charged with 350 g of Bisphenol A, 214.4 g of ethylene carbonate, 91.9 g of propylene carbonate, and 0.73 g of potassium carbonate.

The two samples (A1 and A2) were taken during the alkoxylation stage after 2.0 hours and 3.0 hours reaction at 185° C. The samples were submitted to analyze the three alkoxylated BPA derivatives and residual BPA by LC-MS.

What is claimed is:

1. A method of making a branched polyester resin with a target glass transition temperature, the method comprising:
   reacting monomer bisphenol A (BPA) with a first cyclic alkylene carbonate in the presence of a first base to obtain a first alkoxylated BPA monomer;
   reacting monomer BPA with a second cyclic alkylene carbonate in the presence of a second base to obtain a second alkoxylated BPA monomer;
   copolymerizing one or more alkoxylated BPA monomers with a first diacid and a second diacid in the presence of a catalyst to obtain a copolymer, wherein the one or more alkoxylated BPA monomers comprises the first and the second alkoxylated BPA monomers; and
   condensing the copolymer with an acid anhydride;
   wherein the target glass transition temperature is achieved by adjusting the molar ratio of the first cyclic alkylene carbonate to the second cyclic alkylene carbonate, adjusting the molar ratio of the first alkoxylated BPA monomer to the second alkoxylated BPA monomers, adjusting the molar ratio of the first diacid to the second diacid, or any combination thereof.

2. The method of claim 1, wherein the method further comprises reacting monomer bisphenol A (BPA) with a mixture of the first cyclic alkylene carbonate and the second cyclic alkylene carbonate to obtain a third alkoxylated BPA monomer.

3. The method of claim 1, wherein the glass transition temperature is from 40° C. to 80° C.

4. The method of claim 1, wherein the reacting monomer BPA with the first cyclic alkylene carbonate and the reacting monomer BPA with the second cyclic alkylene carbonate are performed in two separate pots.

5. The method of claim 1, wherein the reacting monomer BPA with the first cyclic alkylene carbonate and reacting monomer BPA with the second cyclic alkylene carbonate are performed in one pot.

6. The method of claim 1, wherein the first and the second cyclic alkylene carbonates are each independently selected from the group consisting of propylene carbonate, ethylene carbonate, 1,2-butylene carbonate, trans-1,3-butylene carbonate, 1,3-propylene carbonate, trans-2,3-butylene carbonate, or cis-2,3-butylene carbonate, and mixtures thereof.

7. The method of claim 1, wherein the first cyclic alkylene carbonate comprises propylene carbonate and the second cyclic alkylene carbonate comprises ethylene carbonate.

8. The method of claim 1, wherein the first and the second diacids are each independently selected from the group consisting terephthalic acid (TPA), phthalic acid, isophthalic acid, fumaric acid, maleic acid, succinic acid, itaconic acid, succinic acid, succinic anhydride, dodecenylsuccinic acid, dodecenylsuccinic anhydride (DDSA), glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof.

9. The method of claim 1, wherein the first diacid comprises terephthalic acid and the second diacids comprises dodecenylsuccinic anhydride (DDSA).

10. The method of claim 1, wherein the acid anhydride comprises a triacid or a tetraacid.

11. The method of claim 1, wherein the target glass transition temperature is achieved by adjusting the molar ratio of the first cyclic alkylene carbonate to the second cyclic alkylene carbonate in the range from 10:90 to 90:10.

12. The method of claim 1, wherein the target glass transition temperature is achieved by adjusting the molar ratio of the first alkoxylated BPA monomer to the second alkoxylated BPA monomer in the range from 10:90 to 90:10.

13. The method of claim 1, wherein the target glass transition temperature is achieved by adjusting the molar ratio of the first diacid to the second diacid in the range from 10:90 to 90:10.

14. The method of claim 1, wherein the copolymer produced after the copolymerizing step has a viscosity of from about 2 to about 10 poise.

15. The method of claim 1, wherein the copolymer produced after the copolymerizing step has a softening temperature (Ts) of at least 95° C.

16. A method of making a branched polyester resin with a target glass transition temperature, the method comprising:
  reacting monomer bisphenol A (BPA) with a first cyclic alkylene carbonate in the presence of a first base to obtain a first alkoxylated BPA monomer;
  reacting monomer BPA with a second cyclic alkylene carbonate in the presence of a second base to obtain a second alkoxylated BPA monomer;
  copolymerizing the first and the second alkoxylated BPA monomers with a first diacid and a second diacid in the presence of a catalyst to obtain a copolymer; and
  condensing the copolymer with an acid anhydride;
  wherein the target glass transition temperature is achieved by adjusting the molar ratio of the first alkoxylated BPA monomer to the second alkoxylated BPA monomers in the range of from 10:90 to 90:10.

17. The method of claim 16, wherein the first cyclic alkylene carbonate comprises propylene carbonate and the second cyclic alkylene carbonate comprises ethylene carbonate.

18. The method of claim 16, wherein the first diacid comprises terephthalic acid and the second diacids comprises dodecenylsuccinic anhydride (DDSA).

19. A method of making a branched polyester resin having a target glass transition temperature of from 50° C. to 62° C., the method comprising:
  reacting monomer bisphenol A (BPA) with propylene carbonate in the presence of a base to obtain a first alkoxylated BPA monomer;
  reacting monomer BPA with ethylene carbonate in the presence of the base to obtain a second alkoxylated BPA monomer;
  reacting monomer bisphenol A (BPA) with a mixture of propylene carbonate and ethylene carbonate in the presence of the base to obtain a third alkoxylated BPA monomer;
  copolymerizing the first and the second alkoxylated BPA monomers with terephthalic acid and dodecenylsuccinic acid (DDSA) in the presence of a catalyst to obtain a copolymer, wherein the mole percent range of DDSA is from about 36 mole percent to about 52 mole percent based on the total moles of the first alkoxylated BPA, the second alkoxylated BPA, terephthalic acid and DDSA; and
  condensing the copolymer with an acid anhydride, wherein the acid anhydride comprises a triacid;
  wherein the target glass transition temperature is achieved by adjusting the molar ratio of propylene carbonate to ethylene carbonate, adjusting the molar ratio of the first alkoxylated BPA monomer to the second alkoxylated BPA monomers, adjusting the molar ratio of terephthalic acid to dodecenylsuccinic anhydride, or any combination thereof.

20. The method of claim 19, wherein the molar ratio of the first alkoxylated BPA monomer:second alkoxylated BPA monomer:third alkoxylated BPA monomer is from about 50:48:2 to about 70:20:10.

* * * * *